Sept. 21, 1954 S. J. RAFF 2,689,884

RECORDING STABILIZER

Filed March 27, 1953 2 Sheets-Sheet 1

INVENTOR
SAMUEL J. RAFF

BY

G. D. O'Brien
R. M. Hicks
ATTORNEYS

Sept. 21, 1954 S. J. RAFF 2,689,884
RECORDING STABILIZER
Filed March 27, 1953 2 Sheets-Sheet 2

INVENTOR
SAMUEL J. RAFF
BY
C. W. O'Brien
R. M. Hicks
ATTORNEYS

Patented Sept. 21, 1954

2,689,884

UNITED STATES PATENT OFFICE 2,689,884

RECORDING STABILIZER

Samuel J. Raff, Adelphi, Md.

Application March 27, 1953, Serial No. 345,273

1 Claim. (Cl. 179—100.1)

(Granted under Title 35, U. S. Code (1952), sec. 266)

The invention described herein may be manufactured and used by or for the Government of the United States of America for governmental purposes without the payment of any royalties thereon or therefor.

This invention relates to a recording stabilizer and more particularly to a method and apparatus for recording and reproducing the amplitude and fequency characteristics of a low frequency signal.

It is known that difficulties are encountered in recording and amplifying low frequency signals due to phase distortion and frequency response. It has heretofore been known to apply low frequency signals to an input chopper whereby the signal intelligence appears as an amplitude modulation of the chopper frequency signal. The recording medium is thus concerned only with a narrow band of frequencies centered about the chopper frequency and the difficulties with phase distortion and frequency response are alleviated.

There remains, however, the difficulty of distinguishing positive and negative inputs. In the chopped signal, this difference is represented by a 180° phase shift of the carrier with respect to the input and output breakers. If the conventional average type detector were used in the playback system, the sign of the input signal would be lost. This difficulty can be overcome by using a D. C. input bias on the chopper greater than the peak amplitude of the signal to be recorded, the bias signal being subtracted after playback and rectification. However, such a bias materially reduces the accuracy of the system. For example, if a predetermined change in the gain of the recorder amplifier occurred while the system was operating without the bias, the error would be a corresponding pecentage of the voltage being recorded at that time; but if the same change occurred while the system was operating with a large bias, a spurious signal would appear of a magnitude which is the predetermined percentage of the bias signal. In order to avoid using this bias, and still retain sign intelligence, it is necessary to reconstitute the signal with a phase-sensitive rectifier.

As disclosed in the copending application of Aaron Z. Robinson and Irvin L. Robey, Serial No. 296,974, filed July 2, 1952, for "A Sound Recording System," a calibration signal which is a multiple of the intelligence carrier signal frequency may be mixed with the intelligence signal before recording. This calibration signal is then separated from the intelligence signal after playback and utilized to operate the phase-sensitive detector in synchronism with the modulator or chopper.

When a signal is recorded and played back, there will be observed fluctuations in output of the playback of one or two db due to inhomogeneities in the recording medium and variations in the parameters of the recording and playback systems. These variations are too small to be disturbing to the human ear, and consequently constitute no serious difficulty when recording sound. However, such fluctuations are undesirable in recorded scientific data. The instant invention utilizes the calibration signal, which calibration signal is recorded and played back by the same heads at the same time and on the same section of the record as the intelligence signal, to compensate for fluctuations in the intelligence signal from the above causes.

A recording system in which a calibration signal is recorded and played back along with the intelligence signal necessitates filters in the playback system to separate the calibration signal from the intelligence signal. Since the amplitude response of the filters is not uniform within the entire pass-band of the filters, any variation in the frequency of the calibration and intelligence signals due to variations in speed in the recording and playback systems varies the amplitude of the signal passed by the filters and consequently introduces amplitude distortion. This amplitude distortion, in addition to the resultant frequency distortion of the intelligence signal is undesirable in the recording of scientific data.

The present invention utilizes the calibration signal to vary the speed of the playback drive mechanism so as to thereby maintain the calibration frequencies substantially constant. Since the intelligence signal is recorded and played back simultaneously by the same recording and playback heads on the same section of the recording medium, the modulated intelligence signal is thereby corrected for variations in the speed of the recording and playback system.

An important object of this invention is to provide a system for recording and accurately reproducing low level, low frequency signals.

Another object of this invention is to compensate for amplitude distortion in the recorded signal due to inhomogeneities in the recording medium.

A further object of this invention is to compensate for amplitude fluctuations in the recorded signal due to variations in pressure of the recording and playback heads on the recording medium.

Yet another object of this invention is to compensate for the amplitude and frequency distortion in the recorded signal due to variations and speed of the recording and playback mechanism.

Other objects and many of the attendant advantages of this invention will be readily appreciated as the same becomes better understood by reference to the following detailed description when considered in conection with the accompanying drawings wherein.

Reference is now made more specifically to the accompanying drawings. Since the recording and playback systems of the present invention are composed of circuit elements which are well known, which elements are connected in a manner to yield the improved results disclosed herein, it is not deemed necessary to illustrate and describe specific details of each of the circuit elements, but merely the novel arrangement to obtain the improved results of the instant invention.

Figure 1:
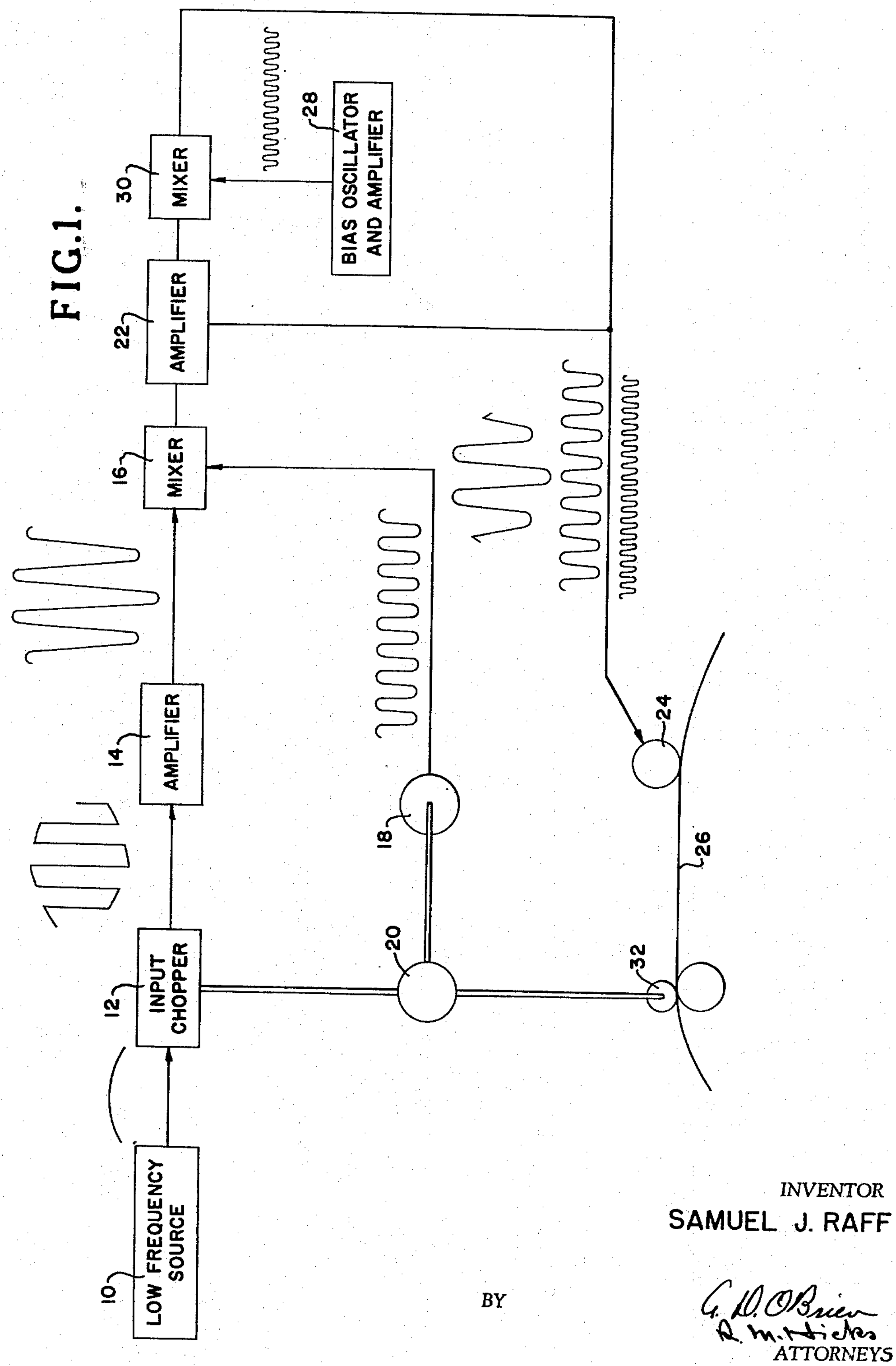
Fig. 1 is a block diagram of the low frequency recording system.

The recording system of the present invention is primarily intended for the recordation and playback of signals in the low frequency range from zero to 3 cycles per second in which the direct recording of such signals is impractical due to difficulties with phase distortion and frequency response. The signals from the low frequency source 10 are applied to a modulator 12, of conventional design, whereby the low frequency signal is transformed into an amplitude modulation of the higher frequencied signal. In the preferred form of the invention, the modulator 12 comprises an input chopper which chops the input voltage at predetermined frequency such as 80 times per second. The amplitude modulated signal from the output of the chopper 12, hereinafter referred to as the intelligence signal, is applied through an amplifier 14 to a mixer 16 wherein the intelligence signal is mixed with a calibration signal. For reasons to be hereinafter set forth more fully, the calibration signal frequency is a multiple of the chopper frequency. In order to maintain the frequency relationship between the chopper frequency and the calibration signal frequency, both the chopper and the calibration signal frequency generator 18 are preferably driven from the same source. In the embodiment illustrated in Fig. 1, the calibration signal frequency source comprises an alternator 18 which is driven from a motor 20. The motor 20 also drives the input chopper 12 in synchronism with the alternator which alternator produces an output calibration signal that is a multiple of the chopper signal frequency. Alternatively, an electromagnetic type chopper may be utilized which chopper may conveniently be driven by the output of a constant frequency oscillator. In this event, the oscillator output voltage could be applied through a frequency multiplying circuit to the mixer 16.

The output of the mixer 16 is applied through an amplifier 22 to the recording head 24 whereby the intelligence signal and the calibration signal are recorded on the record 26. The recording medium 26 may comprise either a magnetic wire or tape as disclosed in the drawings or an impressed disk or cylinder. As is conventional with magnetic tape recording, the high frequency biasing signal generated by the oscillator 28 is utilized for magnetic shaking of the tape, the bias signal being mixed with the calibration and intelligence signals in a mixer 30 and applied to the recording head 24. The recording medium 26 is preferably driven at a constant speed as by the record drive unit 32. The record drive unit may conveniently be mechanically coupled to the motor 20 whereby the recording medium is driven in synchronism with the chopper 12 and alternator 18.

In magnetic tape recording the recording head has a finite area which introduces amplitude distortion in the recorded signals. When recording low frequency signals on a fast moving tape so that the number of cycles of recorded signal per inch of tape is low, this distortion is not very large. However, when the number of cycles per inch of tape is high, the amplitude distortion is appreciable.

Since the intelligence signal and the calibration signal differ widely in frequency, a proportionate change in the number of cycles of each signal recorded per inch of tape produces different amplitude distortion in the respective recorded signals. Therefore in order to maintain the proper relative amplitudes of the two signals it is desirable to drive the recording tape at a speed synchronized with the input chopper and calibration signal generator so that the number of cycles per inch of tape remains constant.

The recording system of the present invention thus records a carrier frequency which is amplitude modulated by the low frequency signal to be recorded and simultaneously records on the same section of the recording medium the calibration signal of a frequency which is a multiple of the carrier frequency, which calibration signal frequency, for reasons to be hereinafter more fully set forth, is preferably of both constant amplitude and frequency.

Figure 2:
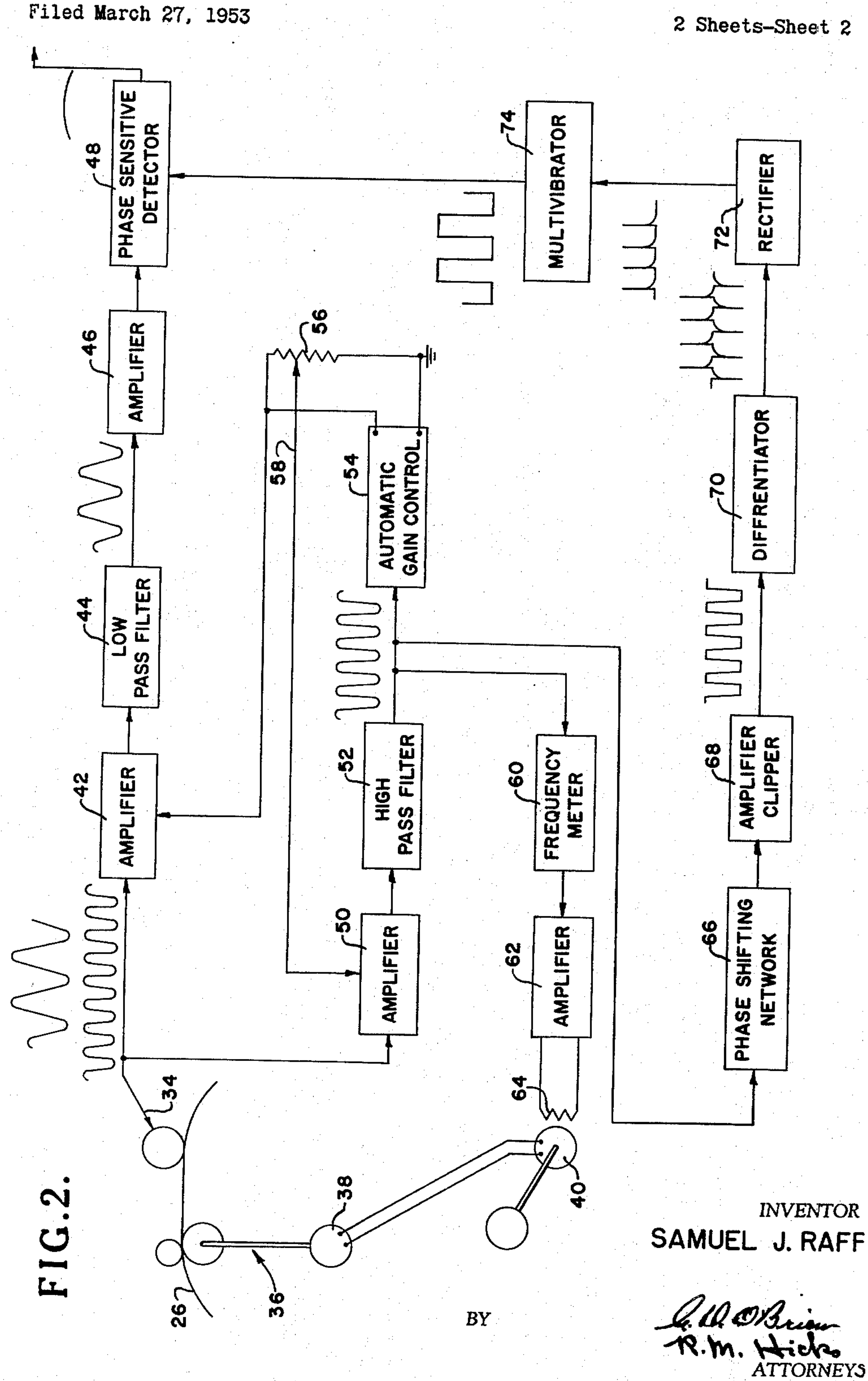
Fig. 2 is a block diagram illustrating the relation of the components used in the low frequency playback system.

Reference is now made more specifically to the record playback system illustrated in Fig. 2 of the drawings. The recording medium or tape 26 is moved past the playback head 28 at a speed determined by the playback drive unit 36. The playback driven unit may be of any conventional construction in which the speed of the playback can be varied in response to a predetermined signal applied thereto. As illustrated in Fig. 2, the playback drive unit 36 comprises variable speed motor 38 which motor is energized by a motor generator unit 40. The recorded calibration signal and intelligence are simultaneously applied through an amplifier 42 to a low-pass filter 44, which low-pass filter discriminates against signals of the frequency of the calibration signal and passes signals of the frequency of the intelligence signal. The output of the low-pass filter 44 is further amplified in amplifier 46 and applied to a phase-sensitive detector 48, of conventional construction.

The calibration signal and intelligence signal are also applied through an amplifier 50 to a high-pass filter 52, which high-pass filter has characteristics such that signals of the frequency of the calibration signal are passed thereby and the lower frequency signals of the intelligence signal frequency are attenuated. The output of the high-pass filter 52 is applied to an automatic gain control circuit 54, which automatic gain control circuit develops the A. G. C. bias across the potentiometer 56. The A. G. C. bias is applied to the amplifier 50 so as to thereby vary the amplification thereof in accordance with the variation in the amplitude of the calibration signal detected by the playback head, whereby the calibration signal after being amplified in the amplifier 50 is of substantially constant level.

Since the calibration signal was of substantially constant amplitude at the input of the recording system, any fluctuations in the amplitude of the calibration signal are due to inhomogeneities in the recording medium or variations in the parameters of the recording and playback systems. Since the calibration signal and the intelligence signal are recorded at the same point in the recording medium, any inhomogeneity which produces an amplitude variation in the calibration signal will also produce a similar amplitude variation in the intelligence signal.

It is a feature of the present invention that the amplifier 42 is biased in the same or in a similar manner to that of the amplifier 50, by the A. G. C. bias developed by the automatic gain control circuit 54. However, since an automatic gain control circuit requires a change in amplitiude to produce operation, the A. G. C. bias developed by the automatic gain control circuit cannot completely correct the output of the amplifier 50 so as to produce a constant level signal. Accordingly, a slightly higher level of bias is applied to the amplifier 42 than is applied to the amplifier 50. The ratio of the two biases is adjustable by means of the variable tap 58 on the potentiometer 56 from which the A. G. C. bias is taken. In this manner, the gain of the intelligence signal amplifier is varied to thereby completely compensate for amplitude variations in the intelligence signal due to inhomogeneity in the recording medium such as variations in the thickness of coating on the magnetic tape or the hardness of the wax disc.

Any variations in speed of the recording medium will produce a frequency distortion in the intelligence signal and will consequently introduce an error in the reconstituted low frequency signal. Additionally, since the amplitude response of the low-pass filter 44 and the high pass filter 52 also vary as a function of the frequency of the signals passed therethrough, any variation in the speed of the recording medium will change the frequency of the intelligence and calibration signals and thereby vary the amplitude of the signals passed by the respective filters. Since it is essential to provide filters to separate the calibration signal from the intelligence signal, and since the automatic gain control system is controlled by the amplitude of the calibration signal after having passed through the filter 52, it is deemed apparent that frequency variations in the calibration signal will introduce an error if the frequency response characteristics of both the filters are not identical.

It is a feature of the present invention to further utilize the calibration signal, which signal as recorded is of constant frequency, to control the speed of the playback drive unit in such a manner as to maintain the frequency of the calibration signal, as detected by the pick-up 34, substantially constant. In this manner the frequency of the intelligence signal in the playback system is maintained constant and the errors due to variation in speed of the playback system are obviated.

In order to control the speed of the playback drive unit 36, the calibration signal after having been separated from the intelligence signal by the filter 52 is passed through a conventional frequency meter 60. The frequency meter 60 is chosen so as to provide an output signal which varies in amplitude in accordance with the deviations of the calibration signal frequency from a predetermined frequency, as determined by the speed of the playback system. Thus, if it is desired to play back the recorded intelligence signal at twice the speed of recordation, in order to permit a more rapid analysis of the data, the frequency meter would produce an output voltage which varied in amplitude in accordance with the change of the calibration signal frequency from a predetermined frequency which is twice the recorded calibration signal frequency. The output of the frequency meter 60 is utilized to control the playback drive unit 36 so as to correct the speed of the playback drive unit in a manner such as to maintain the calibration frequency substantially constant. In the embodiment illustrated in Fig. 2 the output of the frequency meter is applied to an amplifier 62 which amplifier controls the field winding 64 of the generator associated with the motor-generator set 40. The frequency meter 60 is arranged so as to control the amplification of the amplifier 62 in such a manner that a decrease in frequency causes an increase in the voltage applied to the field winding 64 of the generator which thereby increases generator output voltage and decreases the slip in the variable speed motor 38 which drives the playback unit. This speeds up the playback so as to bring the calibration signal frequency back to its proper value and in so doing brings the intelligence signal to its proper value. Conversely, when the calibration signal frequency increases, the voltage applied by the amplifier 62 to the field winding 64 is decreased to thereby decrease the voltage applied to the motor 38 and decreased the playback speed.

Although a variable speed motor-generator system has been described for controlling the speed of the playback in accordance with the variations and frequency of the calibration signal, it is deemed apparent that other arrangements may be utilized such as an electromagnetic clutch for coupling the playback drive unit motor to the drive head.

The calibration signal is also utilized to control the operation of the phase-sensitive detector 48 so that the latter operates in synchronism with the modulator or chopper 12 in the recording system. For this purpose, the calibration signal, after having been separated from the intelligence signal by the high pass filter 52, is applied to a phase shifting network 66, which phase shifting network is adjustable so as to provide proper phase relation between the calibration signal and intelligence signal as applied to the phase sensitive detector 48. The output of the phase shifting network as applied to the amplifier clipper 68 which produces a substantially square wave output voltage correlative in frequency with the calibration signal frequency, which square wave voltage is applied to a differentiator 70. The differentiator produces sharp pulses of alternate positive and negative polarity, which sharp pulses are passed through a rectifier 72. The rectified pulses are utilized to control a multivibrator 74 to thereby produce a square wave output voltage of a frequency equal to one half the frequency of the calibration signal. Since the frequency of the calibration signal, as recorded, was equal to twice the chopper frequency, it is deemed apparent that the square wave output frequency of the multivibrator is equal to the intelligence signal frequency applied to the phase-sensitive detector.

The square wave output of the multivibrator 74 is utilized to control the switching action of the phase-sensitive detector 48 in a manner well known to those skilled in the art.

The recording playback system of the present invention therefore provides for compensation for amplitude variations due to inhomogeneities in the recording medium and further compensate for amplitude and frequency distortion introduced due to variations in the speed of the playback drive mechanism. Further, the use of the calibration signal which is recorded and played back at the same time and on the same section of the recording medium as the intelligence signal to operate the phase-sensitive detector in synchronism with the modulator or chopper permits the amplitude and phase of the low frequency signal to be reconstituted without the necessity of utilizing the biased input chopper. As hereinbefore set forth, this greatly increases the accuracy of the recorder.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

A recording and reproducing apparatus comprising means for amplitude modulating a carrier signal in accordance with a low frequency signal, means for producing a calibration signal of constant amplitude which is harmonically related to the carrier signal, means for simultaneously recording said calibration signal and said amplitude modulated carrier signal on the same section of a recording medium, playback means for reproducing said calibration signal and said carrier signal, first and second filter means associated with said playback means for respectively passing said carrier signal and said calibration signal, automatic gain control means responsive to the amplitude of said calibration signal for varying the amplitude of said amplitude modulated carrier signal, means associated with said second filter means and responsive to variations in frequency of said calibration signal for varying the speed of said playback means to thereby maintain the frequency of the reproduced calibration signal substantially constant, means responsive to said calibration signal for producing a harmonically related control signal of a frequency equal to the carrier frequency, and phase-sensitive detector means associated with said first filter means and responsive to said amplitude modulated carrier signal and said control signal for reconstituting the low frequency signal.

References Cited in the file of this patent

UNITED STATES PATENTS

| Number | Name | Date |
|---|---|---|
| 1,976,355 | Mees et al. | Oct. 9, 1934 |
| 2,029,389 | Ringel | Feb. 4, 1936 |
| 2,113,226 | Young | Apr. 5, 1938 |
| 2,274,505 | Singer | Feb. 24, 1942 |
| 2,334,510 | Roberts | Nov. 16, 1943 |
| 2,337,958 | Albin | Dec. 28, 1943 |